United States Patent [19]

Baldoni et al.

[11] 4,447,171

[45] May 8, 1984

[54] DEMOUNTABLE SEALED JOINT FOR THE FLUID TIGHT CONNECTION OF A SHEET MEMBER TO A SUPPORT

[75] Inventors: Viscardo Baldoni; William J. Vorih, both of Rome, Italy

[73] Assignee: The Firestone Tire & Rubber Company, Akron, Ohio

[21] Appl. No.: 302,910

[22] Filed: Sep. 16, 1981

[30] Foreign Application Priority Data

Nov. 7, 1980 [IT] Italy ............................... 68705 A/80

[51] Int. Cl.³ .......................... B25G 3/08; F16D 1/00
[52] U.S. Cl. ..................................... 403/381; 139/1 R
[58] Field of Search ................ 403/381, 291; 49/489; 277/170, 171, 172, 235 R; 139/1

[56] References Cited

U.S. PATENT DOCUMENTS 2,528,264 10/1950 Coppock et al. ...................... 49/489
2,690,295 9/1954 Rand ..................................... 230/170
3,152,031 10/1964 Nebout ................................. 156/401
4,024,770 5/1977 Liesenborgha ...................... 74/18.2
4,133,367 1/1979 Abell .................................... 160/392

FOREIGN PATENT DOCUMENTS 2213497 9/1972 Fed. Rep. of Germany .
2743356 4/1979 Fed. Rep. of Germany .

Primary Examiner—Wayne L. Shedd
Attorney, Agent, or Firm—Ernst H. Ruf

[57] ABSTRACT

A demountable sealed joint (1) for the fluid tight connection of a sheet member (2) to a support (3), in which the latter is provided with a dovetail groove (5) engaged by a bead (4) of substantially the same shape as said groove and forming a portion of the sheet member (2) and substantially rigid in a transverse direction; the groove (5) comprising two longitudinal undercuts (6, 7) engaged by respective longitudinal extensions (14, 15) of said bead (4) and of which one is more pronounced than the other, the sheet member (2) being connected to the bead (4) substantially at the base of the extension (15) engaged in the more pronounced undercut and at a predetermined distance from the other extension (14).

9 Claims, 12 Drawing Figures

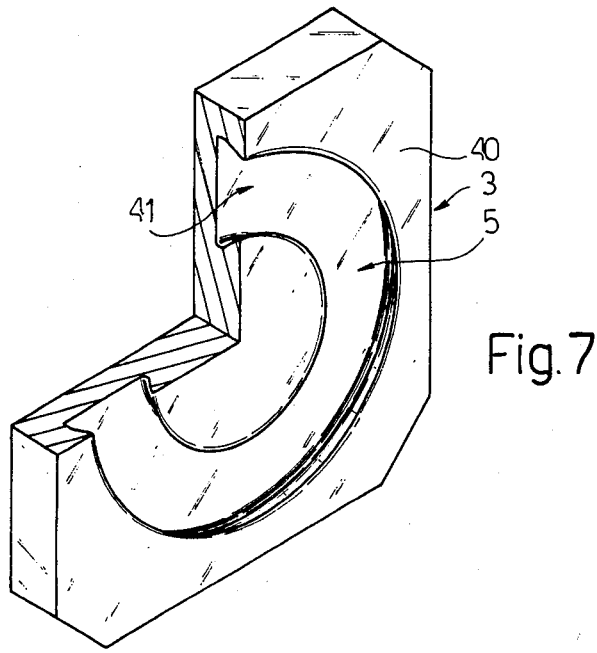
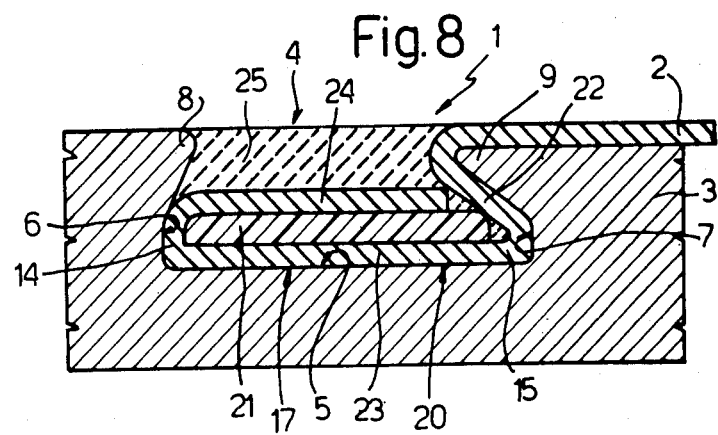
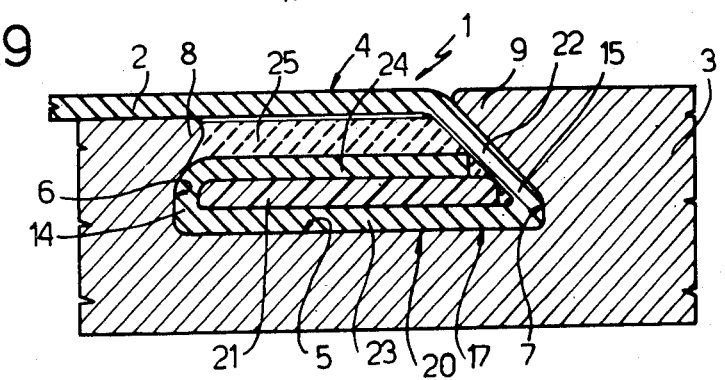

DEMOUNTABLE SEALED JOINT FOR THE FLUID TIGHT CONNECTION OF A SHEET MEMBER TO A SUPPORT

TECHNICAL FIELD

This invention relates to a demountable insertion or sealed joint for the sealed or fluid tight connection of a sheet member to a support.

BACKGROUND ART

The problem of fixing a sheet member to a surface of a support body in a sealed but demountable manner arises very often in practice. In general, such a problem could be solved by cementing the sheet member on to the surface of said support body. However, such a system is not generally advisable if the sheet member has to be easily detachable, and if this later is subjected, as for example in the case of a diaphragm, to fatigue stresses which tend to detach it from the support body.

In the aforesaid cases it is preferred to clamp a peripheral portion of the sheet member between the support body and a fixing element removably connectable to the support body. Said peripheral portion can be constituted by an outer flange lockable on to the support body by means of a backing flange, or by a bead arranged to engage a corresponding groove provided on the support body and locked therein (see for example U.S. Pat. No. 3,152,031) by inserting an insert lockable on the support body.

Although particularly advantageous when wishing to connect a sheet member to a support in a sealed but demountable manner, both the fixing systems described in the preceding paragraph are not free from drawbacks in that in all cases they require the use of the aforesaid fixing element, the assembly and removal of which are not always simple, and of which the sizes are sometimes such as to lead to an increase in the dimensions of all the possible surrounding members.

In order to obviate the aforesaid drawbacks, it is known to connect a sheet member to a support body in a sealed manner by means of a bead of trapezoidal shape (see for example U.S. Pat. No. 4,024,770) rigid with the sheet member and housed in a groove of the same shape provided on the support body.

Such a fixing system does not require the use of any additional fixing member, and is particularly effective in the case in which the sheet member, or at least that part of it in proximity to said bead, is subjected to forces which urge it against the support body or tend to cause it to slide therealong, but proves totally ineffective if forces are applied to the sheet member which tend to detach it from the support body.

This is due to the fact that in order to be able to be inserted into the relative trapezoidal groove, said bead must necessarily be constructed by material which deforms elastically with relative ease. Consequently, it is not able to react to even low intensity forces which tend to extract it from the relative groove.

DISCLOSURE OF THE INVENTION

The object of the present invention is to provide a joint for the sealed connection of a sheet member to a support body, which is easily demountable, requires no additional fixing member, and is able to resist the forces applied to the sheet member and compatible with the strength thereof independently of their direction.

The said object is attained according to the present invention by a demountable insertion joint for the sealed connection of a sheet member to a support, said joint comprising a bead rigid with said sheet member, and a seat for said bead provided on said support and constituted by a groove having a substantially dovetail-shaped cross-section and provided with a first and a second undercut; said bead having, in cross-section, a shape conjugate with that of said seat and provided with a first and a second extension or nose engaged respectively in said first and said second undercut; said bead being substantially rigid in a transverse direction, said second undercut being deeper than the first, and said sheet member being connected to said bead substantially at the base of said second nose and at a predetermined distance from said first nose.

According to a preferred embodiment of the said invention, said bead is provided with an internal core substantially rigid in the direction transverse to a longitudinal axis of said bead, this latter preferably comprising a peripheral portion of said sheet member wound about said core.

The present invention also relates to a method for the sealed or fluid tight connection of a sheet member to a support, said method being characterized in that it comprises the stages or steps of:

providing said support with a seat consisting of a groove having a substantially dovetail-shaped cross-section, said groove having first and second longitudinal undercuts, of which the second is deeper than the first;

extending or arranging said sheet member over said support so that a first position of said sheet member to be connected to said support is disposed above said seat, and a second portion of said sheet member extends from said first portion on the same side of said seat as said second undercut;

disposing above said seat a core which is substantially rigid in a direction transverse to a longitudinal axis of said seat, and inserting a longitudinal edge of said core and part of said first portion of said sheet member into said second undercut; and causing said core and the remaining part of said first portion of said sheet member to snap into said seat so as to sealingly compress said first portion within both said undercuts.

Further characteristics and advantages of the present invention will be apparent from the description given hereinafter with reference to the accompanying drawings, which illustrate some non-limiting embodiments thereof.

BRIEF DESCRIPTION OF THE DRAWINGS

FIGS. 4, 5, 6 and 7 are each diagrammatic perspective views of a particular type of support for the joint of FIG. 1;

FIGS. 8 and 9 are sections through two preferred embodiments of the joint of FIG. 1;

BEST MODE FOR CARRYING OUT THE INVENTION

Figure 1:
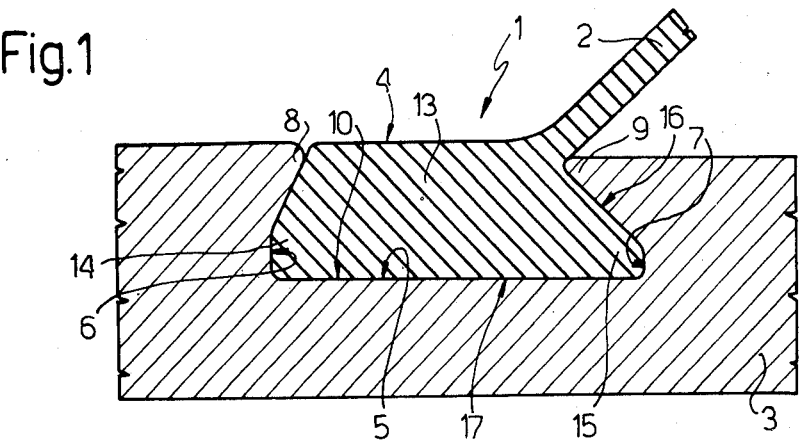
FIG. 1 is a diagrammatic section through a joint constructed in accordance with the present invention.
Figure 2:
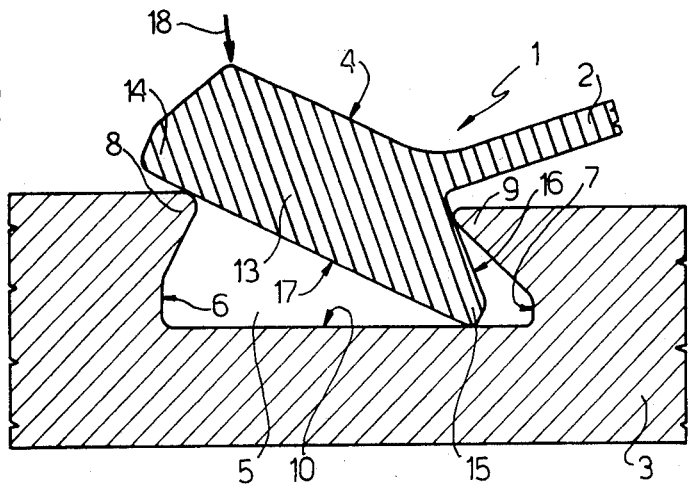
FIGS. 2 and 3 are diagrammatic views of the joint of FIG. 1 during assembly and demounting respectively.
Figure 3:
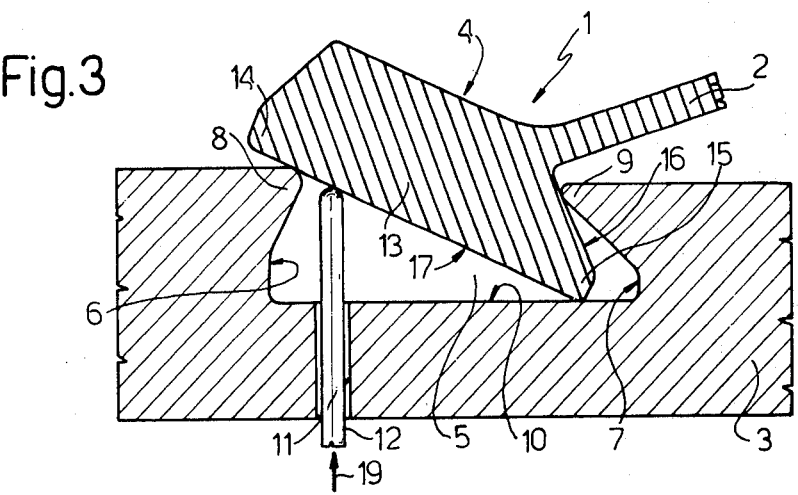

FIGS. 1 to 3 show a joint, indicated overall by 1, for the sealed connection of a sheet member 2 to a support body 3.

The joint 1 comprises a first member constituted by a bead 4 rigidly connected to the sheet member 2, and a second member constituted by a seat 5 provided on the body 3.

The seat 5 is constituted by a groove having a substantially dovetail-shaped cross-section, and provided with a first lateral undercut 6 and a second lateral undercut 7 extending longitudinally along the entire seat 5, and of which the second undercut 7 is deeper than the first.

The two undercuts 6 and 7 are defined externally by respective projections 8 and 9 facing each other, and internally by a flat surface 10 through which there is provided a bore 11 disposed in proximity to the undercut 6 and immediately to the outside of the free end of the projection 8. The bore 11 is arranged to receive a rod 12 which is mobile through the body 3 in order to expel the bead 4 from the seat 5 when operated.

The bead 4 has a cross-section substantially identical to that of the seat 5, and is constituted by a central portion 13 which is substantially rigid in a tranverse direction and is of substantially rectangular cross-section, from which two extensions or noses 14 and 15 of substantially triangular shape project in opposite directions, and of which the first is arranged to engage the undercut 6, and the second, more pronounced than the first, is arranged to engage the undercut 7.

The sheet member 2 is connected to the bead 4 substantially at the base of the nose 15, i.e., at that end of the central portion 13 facing the nose 15, and at a certain or predetermined distance from the nose 14.

As shown in FIG. 2, the bead 4 is introduced into the seat 5 by firstly inserting the nose 15 below the projection 9 and partly in engagement with the inside of the undercut 7 until the free end of the projection 9 is brought into contact with an inclined lateral surface 16 of the nose 15, the free end of this latter is brought into contact with the surface 10, and a flat base surface 17 of the bead 4 is brought into contact with the free end of the projection 8.

A pressure is then applied to the bead in the direction of the arrow 18 of FIG. 2, in order to cause the nose 14 to snap below the projection 8 and bring the bead 4 into perfect engagement with the seat 5.

As shown in FIG. 3, the bead 4 is extracted from the seat 5, in a very simple and practical manner, by applying a thrust to the rod 12 in the direction of the arrow 19.

In the preferred embodiments shown in FIGS. 8 and 9, the bead 4 is constructed by winding a peripheral portion 20 of the sheet member 2 about a core 21 which has a substantially rectangular, flat cross-section. The core 21 has a width which is slightly less than that of the surface 10, and is constituted by a material which gives the core 21 a relatively high rigidity in a transverse direction, i.e., in the direction parallel to the surface 17 and perpendicular or transverse to the longitudinal axis of the bead 4.

The peripheral portion 20 is wound about the core 21 so as to form an inclined portion 22 defining the nose 15, a flat base portion 23 defining the surface 17, and a flat portion 24 covering the core 21 and partially defining the nose 14. The bead 4 is completed by means of the filling material 25, preferably consisting of a vulcanized elastomeric material, the thickness of which varies according to the position assumed by the sheet member 2 relative to the bead 4. In particular, the thickness of the material 25 is less when (FIG. 9) the sheet member 2 is bent over the bead 4.

With regard to the core 21, this can be a plate 26 (FIG. 10) of elongated shape, preferably constituted for example by flexible plastics material, or alternatively a strip 27 (FIG. 11) comprising a layer 29 of rubber or other like elastomer material internally reinforced by means of preferably metal rods, cords or wires 30 arranged to give the strip 27 a high transverse rigidity, or, more simply, by a flat spring 31 (FIG. 12) obtained by bending a metal wire to form a broken line of sinusoidal pattern defining two lateral longitudinal ribs 32 maintained at a substantially constant distance from each other by a plurality of inclined transverse struts 33.

Figure 4:
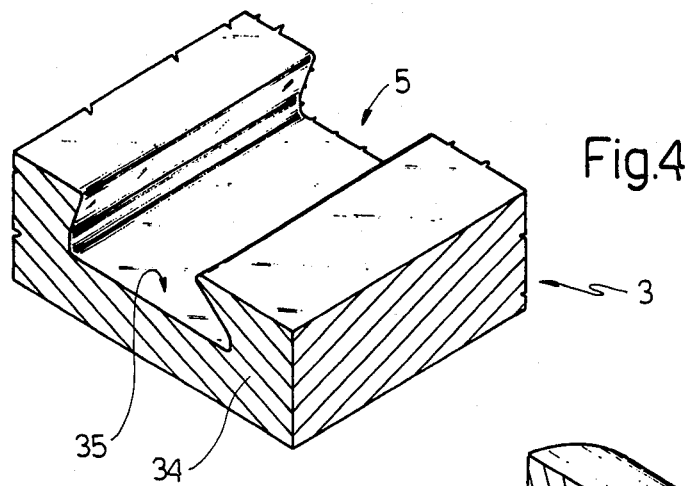
Figure 5:
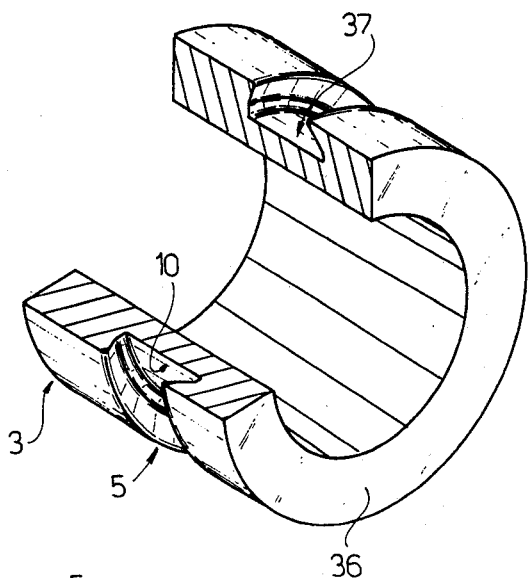

The use of one or other of the types of core 21 heretofore defined depends on the shape both of the support body 3 and of the axis of the seat 5. In particular, if the support body 3 is constituted by a flat plate 34 as in the example of FIG. 4, and the seat 5 is constituted by a substantially rectilinear groove 35, it is possible to use any of the types of core 21 described with reference to FIGS. 10, 11 and 12. In contrast, if the support body 3 is constituted by a cylindrical sleeve 36 (FIG. 5) and the seat 5 is constituted by a groove 37, the base surface 10 of which is a portion of a cylindrical surface, the strip 27 or the spring 31 must be used as the core 21. This is because in this case the core 21 used must be elastically deformable longitudinally, due to the fact that before engaging the groove 37 the bead 4 must be mounted over the sleeve 36, the outer diameter of which is greater than the diameter of the surface 10 with which the bead 4 is arranged in contact.

Figure 6:
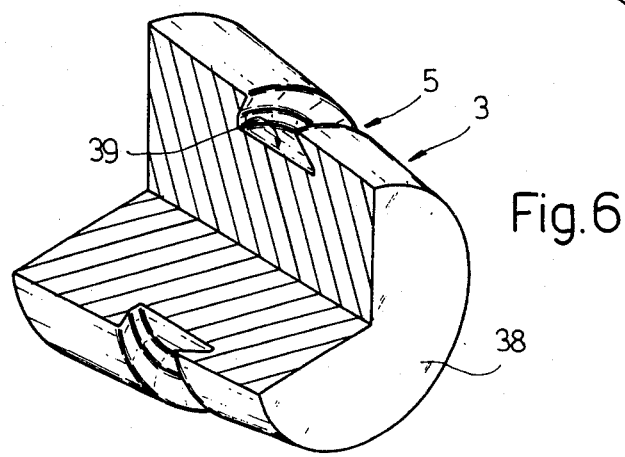
Figure 10:
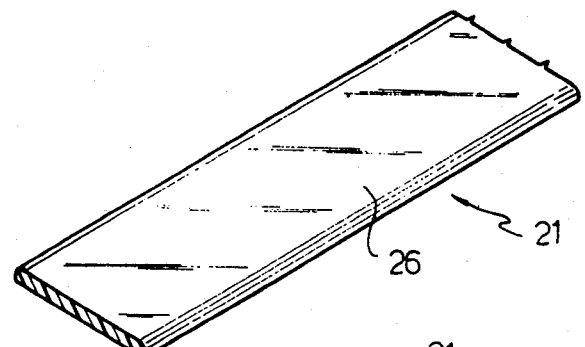
FIG. 10 is a perspective view of a detail of FIGS. 8 and 9.
Figure 11:
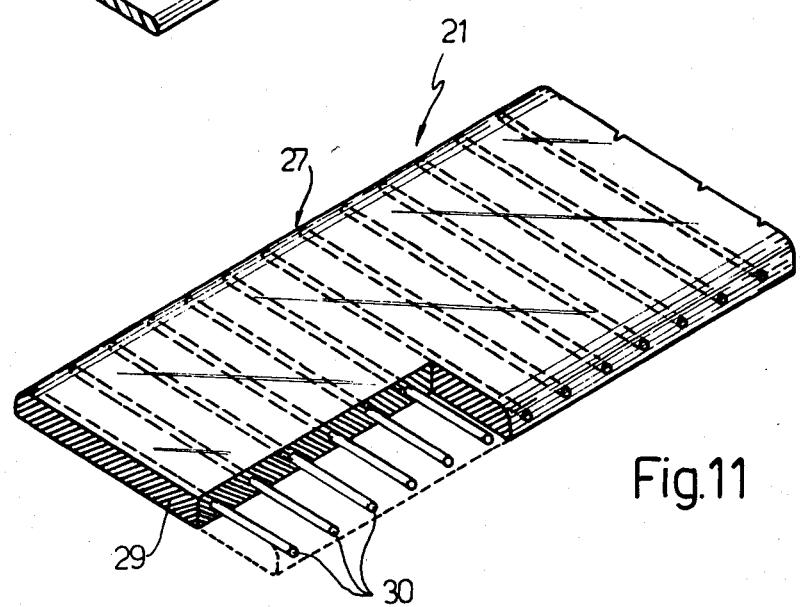
FIG. 11 is a partly sectional perspective view of a first modification of the detail of FIG. 10.
Figure 12:
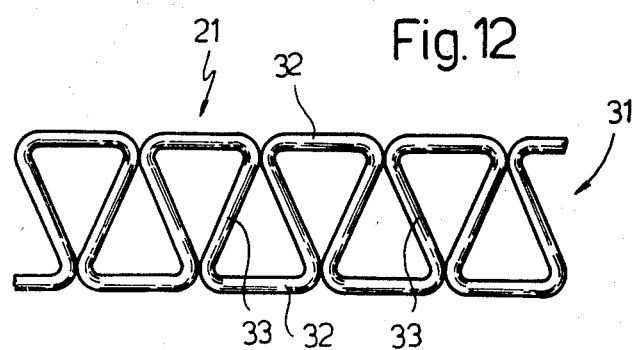
FIG. 12 is a perspective view of a second modification of the detail of FIG. 10.

A core 21 which is elastically deformable longitudinally, such as the strip 27 or the spring 31, must also be preferably used if the support body 3 is constituted by a cone frustum body 38 (FIG. 6), with an annular groove 39 provided on its outer surface to receive the bead 4, whereas any of the cores 21 illustrated in FIGS. 10, 11 and 12 can be used if the support body 3 is constituted by a flat wall 40 (FIG. 7) comprising an annular groove 41.

If FIG. 1 is considered together with FIGS. 8 and 9, it can be immediately noted that the shape of the seat 5 and bead 4, the transverse rigidity of this latter due in the illustrated embodiments to the presence of the core 21, and the particular position of the point of connection of the sheet member 2 to the bead 4 give an extremely high stability to the joint 1. In this respect, observing the aforesaid figures, it can be noted that a force applied to the sheet member 2 gives rise, whatever its direction, to a force directed transversely to the bead 4 and tending to squeeze this latter into the undercut 6, and to a moment tending to rotate the bead 4 about its own axis and to squeeze the nose 15 thereof into contact with the inner surface of the projection 9. In other words, when the sheet member 2 is under stress, the bead 4 tends to leave the seat 5 at the end corresponding to the nose 15, which because of its dimensions and the substantial transverse rigidity of the bead 4, is able to resist any traction compatible with the mechanical strength of the sheet member 2.

It should finally be noted that the greater the force applied to the sheet member 2, the greater the contact pressure between the noses 14 and 15 and the relative undercuts 6 and 7, and the greater the capacity of the joint 1 for sealing against the passage of fluids.

An extremely simple method for connecting a sheet member 2 to a support body 3 in a sealed manner can easily be deduced from a consideration of the embodiments illustrated in FIGS. 8 and 9. Such a connection can be made by providing the seat 5 on the support body 3 and extending over this seat that portion of the sheet member 2 which is to be connected to the body 3 so that the remaining portion of the member 2 is disposed on the same side of the seat 5 as the projection 9. The core 21 is then disposed above the sheet element 2, and is then thrust by way of one of its longitudinal edges into the undercut 7, in which it remains embedded together with a portion of the sheet member 2. The core 21 snaps into the seat 5 as a result of a force applied to its other longitudinal edge, and the sheet member 2 remains pinched in a sealed manner between the longitudinal edges of the core 21 and the base of the undercuts 6 and 7.

At this point the joint has been made, and if required can be completed by bending the sheet member 2 over the core 21 so as to form the flat portion 24, and adding the filling material 25 which connects the sheet member 2 to the core 21 in a non-removable manner, and fills that part of the seat 5 which is still free.

What is claimed is:

1. A demountable sealed joint for the fluid tight connection of a sheet member to a support, said joint comprising a bead forming a portion of said sheet member, and a seat for said bead provided on said support and consisting of a groove having a substantially dovetail cross-section and provided the first and second undercuts; said bead having, in cross-section, a shape substantially conjugate with that of said seat and provided with first and second extensions engaging said first and second undercuts respectively; characterized in that said bead is substantially rigid in a transverse direction, said second undercut being deeper than the first, and said sheet member extending from said bead substantially at the base of said second extension and at a predetermined distance from said first extension.

2. A joint according to claim 1, characterized in that said bead is provided with an internal core substantially rigid in the direction transverse to a longitudinal axis of said bead.

3. A joint according to claim 2, characterized in that said internal core is elastically deformable in the longitudinal direction.

4. A joint according to claim 3, characterized in that said internal core comprises a flat spring consisting of a metal wire bent to form a broken line of sinusoidal pattern defining two longitudinal lateral ribs connected together by a plurality of inclined transverse struts.

5. A joint according to claim 3, characterized in that said internal core consists of a strip of elastomeric material which is internally transversely reinforced by a plurality of axially substantially rigid rods.

6. A joint according to claim 2 characterized in that said bead comprises a peripheral portion of said sheet member, said peripheral portion being wound at least partially about said internal core.

7. A joint according to claim 3 characterized in that said bead comprises a peripheral portion of said sheet member, said peripheral portion being wound at least partially about said internal core.

8. A joint according to claim 4 characterized in that said bead comprises a peripheral portion of said sheet member, said peripheral portion being wound at least partially about said internal core.

9. A joint according to claim 5 characterized in that said bead comprises a peripheral portion of said sheet member, said peripheral portion being wound at least partially about said internal core.

* * * * *

UNITED STATES PATENT AND TRADEMARK OFFICE
CERTIFICATE OF CORRECTION

PATENT NO. : 4,447,171
DATED : May 8, 1984
INVENTOR(S) : Viscardo Baldoni & William J. Vorih It is certified that error appears in the above-identified patent and that said Letters Patent are hereby corrected as shown below:

Claim 1, line 34, "the first" should read --with first--

Signed and Sealed this

Sixteenth Day of October 1984

[SEAL]

Attest:

GERALD J. MOSSINGHOFF

Attesting Officer

Commissioner of Patents and Trademarks